United States Patent
Leportier (10) Patent No.: US 11,034,265 B2
(45) Date of Patent: Jun. 15, 2021

(54) HINGE MECHANISM, VEHICLE SEAT COMPRISING SUCH A MECHANISM, AND MANUFACTURING METHOD

(71) Applicant: Faurecia Sièges d'Automobile, Nanterre (FR)

(72) Inventor: Luc Leportier, Athis Val de Rouvre (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/522,857

(22) Filed: Jul. 26, 2019

(65) Prior Publication Data

US 2020/0031252 A1 Jan. 30, 2020

(30) Foreign Application Priority Data

Jul. 27, 2018 (FR) ..................................... 18 57050

(51) Int. Cl.
*B60N 2/225* (2006.01)
*B60N 2/68* (2006.01)

(52) U.S. Cl.
CPC ........... *B60N 2/2252* (2013.01); *B60N 2/682* (2013.01); *B60N 2205/20* (2013.01)

(58) Field of Classification Search
CPC .. B60N 2/2251; B60N 2/2254; B60N 2/2252; B60N 2/682; B60N 2205/20
See application file for complete search history.

(56) References Cited

U.S. PATENT DOCUMENTS

| 7,950,742 | B2 * | 5/2011 | Endo ..................... | B60N 2/236 297/354.12 |
| 8,282,168 | B2 * | 10/2012 | Kienke ............... | B60N 2/2252 297/367 R |
| 9,205,764 | B2 * | 12/2015 | Hiemstra ............ | B60N 2/2254 |
| 9,303,685 | B2 * | 4/2016 | Scholz ................ | B60N 2/2252 |
| 9,440,561 | B2 * | 9/2016 | Tsuji ................... | B60N 2/2252 |
| 2007/0035168 | A1 * | 2/2007 | Assmann ............ | B60N 2/2252 297/353 |
| 2012/0019041 | A1 | 1/2012 | Leconte et al. | |
| 2012/0161487 | A1 | 6/2012 | Hiemstra et al. | |

FOREIGN PATENT DOCUMENTS

| DE | 102004018744 B3 | 9/2005 |
| FR | 2962944 A1 | 1/2012 |
| WO | WO2011019346 A1 | 2/2011 |

OTHER PUBLICATIONS

French Search Report corresponding to French application No. FR1857050, dated Mar. 28, 2019, 2 pages.
Written Opinion corresponding to French application No. FR1857050, dated Jul. 27, 2018, 4 pages.

* cited by examiner

*Primary Examiner* — Philip F Gabler
(74) *Attorney, Agent, or Firm* — Reising Ethington P.C.

(57) ABSTRACT

A hinge mechanism having first and second hinge flanges, a control device controlling the relative rotation of the first and second hinge flanges, a closure ring integrally secured to the second hinge flange and retaining the first flange against the second flange, and an external frame integrally secured to the second flange. The second hinge flange is integrally secured to both the external frame and the retaining ring by the same weld.

14 Claims, 12 Drawing Sheets

HINGE MECHANISM, VEHICLE SEAT COMPRISING SUCH A MECHANISM, AND MANUFACTURING METHOD

TECHNICAL FIELD

The present description relates to hinge mechanisms, to vehicle seats comprising such mechanisms, and to the methods for manufacturing such hinge mechanisms.

More particularly, the present description relates to a hinge mechanism comprising:
- first and second hinge flanges mounted so as to rotate relative to one another about at least one axis of rotation, and defining an internal volume between them,
- a control device arranged in the internal volume and controlling a relative rotation of the first and second hinge flanges,
- a closure ring integrally secured to the second hinge flange and retaining the first hinge flange against the second hinge flange, and
- an external frame integrally secured to the second hinge flange.

BACKGROUND

Document FR2962944 describes an example of a hinge mechanism of this type.

SUMMARY

A particular aim of the present description is to make the method for manufacturing the hinge mechanism simpler and more economical. For this purpose, in a hinge mechanism of the kind in question, the second hinge flange is integrally secured to both the external frame and the retaining ring by the same weld.

This simplifies the manufacturing process and makes it more economical, as it only takes one weld to secure the closure ring, the second hinge flange, and the external frame.

In various embodiments of the hinge mechanism, one or more of the following may also be used:
- the second hinge flange is further secured to the retaining ring by crimping;
- the retaining ring has a plurality of outer tabs crimped onto an outer periphery of the second hinge flange;
- the weld extends angularly across a plurality of sections where each pair of adjacent sections is separated by said outer tabs;
- the second hinge flange comprises a flat annular outer portion which has an outer periphery, the closure ring comprising a flat annular outer portion which bears axially against the outer portion of the second hinge flange, the outer portion of the closure ring having an outer periphery arranged to correspond to the outer periphery of the outer portion of the second hinge flange, the external frame defining an internal opening in which is nested at least the outer periphery of the outer portion of the second hinge flange;
- the external frame is a lateral flange that is part of either a backrest frame or a seating portion frame;
- the external frame is a bracket adapted for attachment to a lateral flange that is part of either a backrest frame or a seating portion frame;
- the hinge mechanism further comprises a structural part which is integrally secured by said weld to the second hinge flange, the external frame, and the closure ring;
- the first hinge flange comprises a collar extending axially along said at least one axis of rotation through the retaining ring, said collar being welded to an additional external frame by an additional weld.

Another object of the description is a vehicle seat comprising first and second parts connected to one another by a hinge mechanism as defined above, the first and second hinge flanges being respectively fixed to the first and second parts. The first part of the seat may be a seating portion and the second part of the seat may be a backrest. Finally, a further object of the present description is a method for manufacturing a hinge mechanism as defined above, comprising the following steps:
- (a) a temporary fixing step, in which the closure ring is fixed temporarily on the second hinge flange,
- (b) an assembly step, in which the welding is carried out in a manner that permanently assembles the closure ring, second hinge flange, and external frame.

It is possible, during step (a), to crimp the outer tabs of the retaining ring onto the outer periphery of the second hinge flange, and during step (b), the welding may be carried out in said plurality of sections where each pair of adjacent sections is separated by said outer tabs.

In one embodiment, the hinge mechanism has a first main face corresponding to the first hinge flange and a second main face corresponding to the second hinge flange, and:
during step (b), the closure ring is welded to the second hinge flange and the external frame, from the first main face of the hinge mechanism, the method comprising an additional step (c), subsequent to step (b), in which the collar of the first hinge flange is welded to said additional external frame, from said first main face of the hinge mechanism.

BRIEF DESCRIPTION OF THE DRAWINGS

Other features and advantages will be apparent from the following description of two embodiments, given as non-limiting examples, with reference to the accompanying drawings.

In the drawings.

DETAILED DESCRIPTION

In the various figures, the same references designate identical or similar elements.

Figure 1:
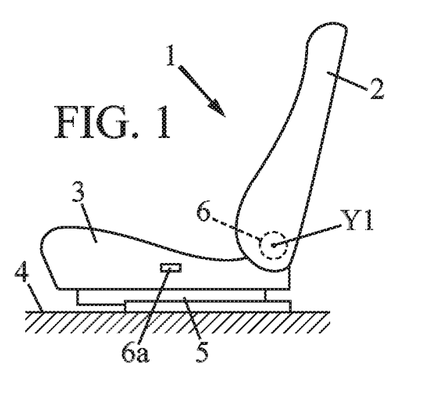
FIG. 1 is a schematic view of a vehicle seat that can be equipped with a hinge mechanism according to the present description, in a first embodiment.

FIG. 1 represents a front seat 1 of a motor vehicle, which comprises a backrest 2 mounted so as to pivot on a seating portion 3 about an axis Y1, the seating portion being mounted on the floor 4 of the vehicle, for example by means of rails 5.

The tilt of the backrest 2 can be adjusted for example electrically by means of a control button 6a or the like, which controls an electric driving device (in particular a geared motor) to drive a geared hinge mechanism 6, of which one type of embodiment is shown in FIGS. 2 to 6. It is equally possible for the tilt adjustment to be manual without departing from the scope of this description.

This hinge mechanism 6 comprises (see FIGS. 2 to 6):
- a first frame 7 comprising a first disk-shaped metal flange 7a which extends in a plane perpendicular to axis Y1 and which, in the example shown, may be for example secured to the frame of the seating portion 3, the first flange 7a having a central opening and extended axially by a first collar 30 forming a right circular cylinder centered on the first axis Y1,
- a second frame 8 comprising for example a second disk-shaped metal flange 8a which extends parallel to the first flange 7a, said second flange 8a being for example integrally secured to the frame of the backrest 2 and retained against the first flange 7a by a metal closure ring 9 welded to the second flange 8a while surrounding the first flange 7a, the second flange 8a having a central opening 8b forming a right circular cylinder centered on a second axis Y2 parallel to the first axis Y1 but offset relative to it, said first collar 30 being arranged in the central opening 8b and said central opening 8b where appropriate partially defined by a second collar 20 which axially extends the second flange 8a towards the first flange 7a,
- a cycloid gear 10 interconnecting the first and second frames 7, 8 (see FIG. 6),
- and an input member 11, also called a control stem, which controls the cycloid gear 10.

The input member 11, clearly visible in FIGS. 2 to 5, may for example be made in one piece by molding plastic or a light alloy.

The input member 11 comprises a plate 14 perpendicular to the first and second axes Y1, Y2, which is pivotably mounted in the central opening 8b of the second frame 8 and axially covers the first collar 30.

The plate 14 of the control member may in particular comprise an annular lip 14b centered on the second axis Y2 and rotating within the central opening 8b of the second frame.

The plate 14 may comprise a central opening 14a that is square (or ribbed, or having any shape that is not of revolution). The plate 14 may further comprise fingers 15 extending axially towards the first frame 7, their utility to be seen further below.

The plate 14 may be solid (apart from the central opening 14a) and is in axial contact with an annular outer surface of the second flange 8a around the central opening 8b.

The control member 11 may be integrally secured to a closure part 12 having a closure plate 12a and a central shaft 12b traversed by a central opening 13 that is square (or ribbed, or having any shape that is not of revolution). The closure part 12 may be made for example of plastic. The closure plate 12a and the central shaft 12b may be formed as one piece.

The closure plate 12a is solid (aside from the central opening 13) and in axial contact with an annular outer surface of the first flange 7a.

The central shaft 12b extends along axis Y2 within the first collar 30, with radial clearance. The central shaft 12b may have a cross-section that is complementary to the central opening 14a of the plate 14. The central shaft 12b is fitted into the central opening 14a of the plate 14, and it is retained on the control member 11 by a retaining part 39 (self-locking ring) forcibly fitted on the central shaft 12b and locked on said central shaft 12b by abutment against an outer surface of the plate 14 of the control member 11.

The control member 11 thus defines a closed interior volume with the central shaft 12b, the closure plate 12a, and the first and second flanges 7, 8.

Figure 2:
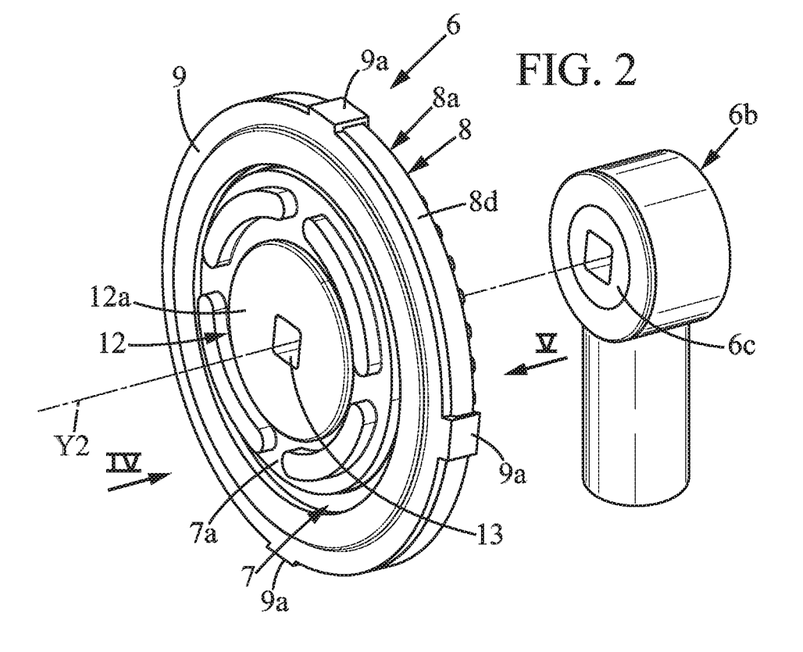
FIGS. 2 and 3 are perspective views, in two opposite directions, of the hinge mechanism that can equip the seat of FIG. 1, in one embodiment of the invention.
Figure 3:
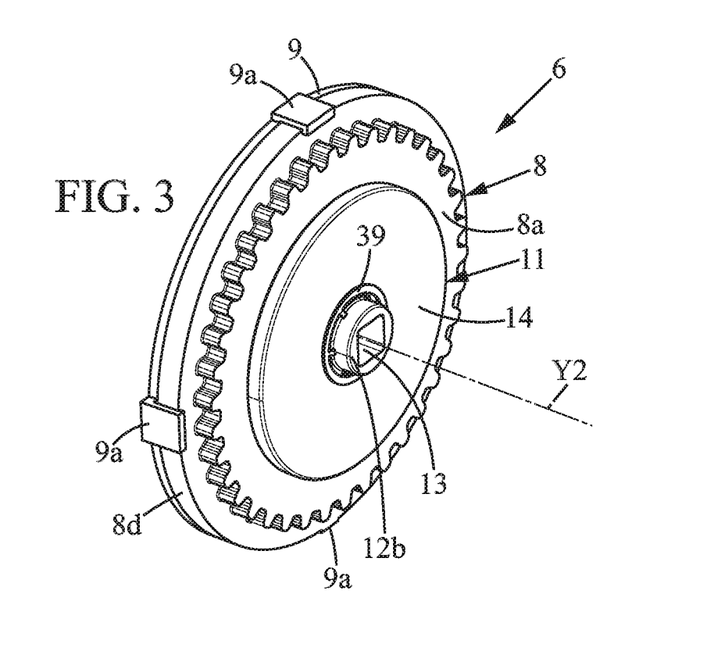

As is schematically represented in FIG. 2, the control member may be rotated about the second axis Y2 by an electric driving device 6b, for example a geared motor, which is integral with the backrest 3 and which has an output member 6c that is rotatable about axis Y2, connected to the central shaft 12b (the output member 6c may for example comprise a central opening having the same cross-section as central opening 13, and a rod of the same cross-section can be nested in the two openings).

The cycloid gear 10 may be a single-train gear which comprises for example:
- a first circular set of teeth 27 centered on axis Y1, this set of teeth being oriented radially outwards and formed at the periphery of the flange 7a of the first frame,
- a second circular set of teeth 28 which is formed on the inner face of the second frame 8 and which is oriented radially inwards, this second set of teeth being centered on axis Y2, said second set of teeth 28 having an inside diameter that is greater than the outside diameter of the first set of teeth 27,
- and an eccentric cam 29, for example of metal, which extends perpendicularly to the axes Y1, Y2 and which is driven by the input member 11, this eccentric cam 29 rotating about the first collar 30 in the central opening 8b of the second frame.

The eccentric cam 29 can take various forms. In the example shown, the eccentric cam 29 may comprise a rigid ring 29a which has indentations 31 into which the aforementioned fingers 15 of the control member are inserted. These indentations may be defined by radial fingers 32 formed externally to the ring 29a, on a circular sector of said ring 29a. The ring 29a rotates around the first collar 30, where appropriate with an interposed ring 35 forming a bearing.

The eccentric cam 29 may further comprise two rigid wedge-shaped members 33 which each extend angularly opposite to one another, radially tapering away from each other. The rigid wedge-shaped members 33 are biased apart from each other by a spring 34 in order to maximize the eccentricity of the eccentric cam when the mechanism 6 is not being controlled, in a manner that is known per se.

A ring 36 forming a bearing may, when appropriate, be interposed radially between the eccentric cam 29 and the aforementioned central opening 8b, this ring 35 also able to form a bearing for the annular lip 14b of the control member 11.

The second flange 8a is fixed to a rigid metal external frame 40, which may in particular be integrally secured to the backrest 2.

Figure 6:
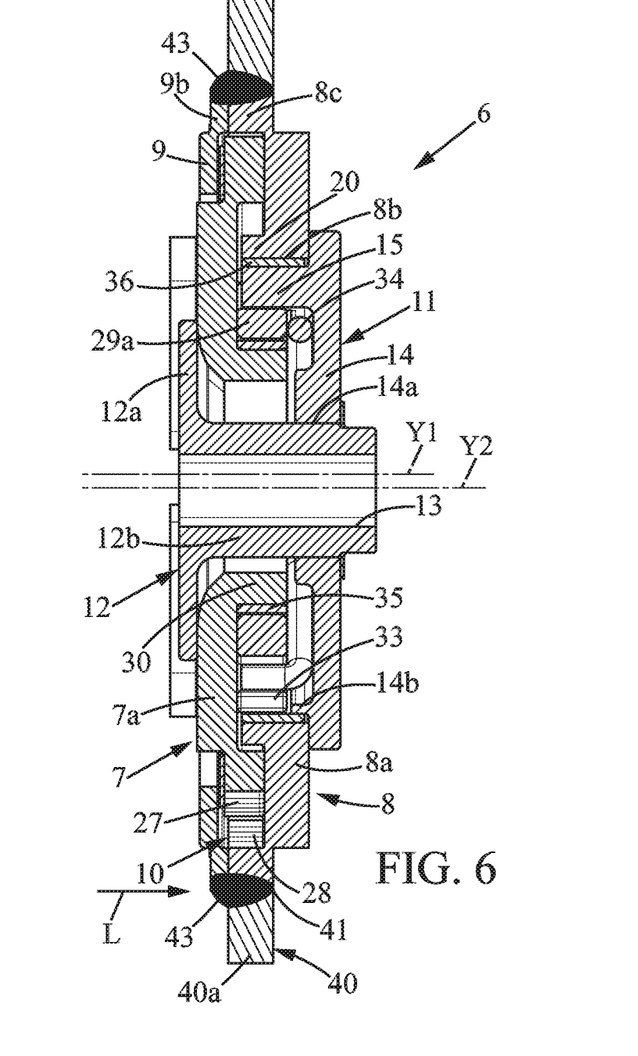
FIG. 6 is an axial section view of the hinge mechanism of FIG. 2, FIGS. 6A, 6B, and 6C are views similar to FIG. 6, for variant embodiments.
Figure 6A:
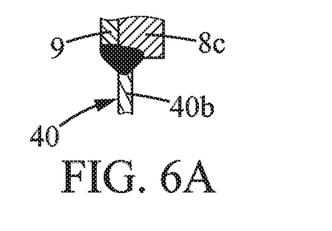
Figure 6B:
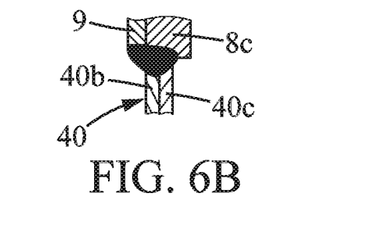

The external frame 40 may be composed for example of:
a bracket 40a (FIG. 6) adapted to be fixed to the lateral flange of the frame of the backrest 2,
a lateral flange 40b that is part of the frame of the backrest 2 (FIG. 6A),
the superposition of a lateral flange 40b that is part of the frame of the backrest 2 and of a metal support 40c (FIG. 6B).

The second frame 8 could possibly be integral with the seating portion 3 and the first frame 7 integral with the backrest 2, in which case the external frame 40 would be integral with the seating portion 3, and could for example be either a lateral flange of the frame of the seating portion 3 or a bracket suitable for attachment to the lateral flange of the frame of the seating portion 3.

Figure 4:
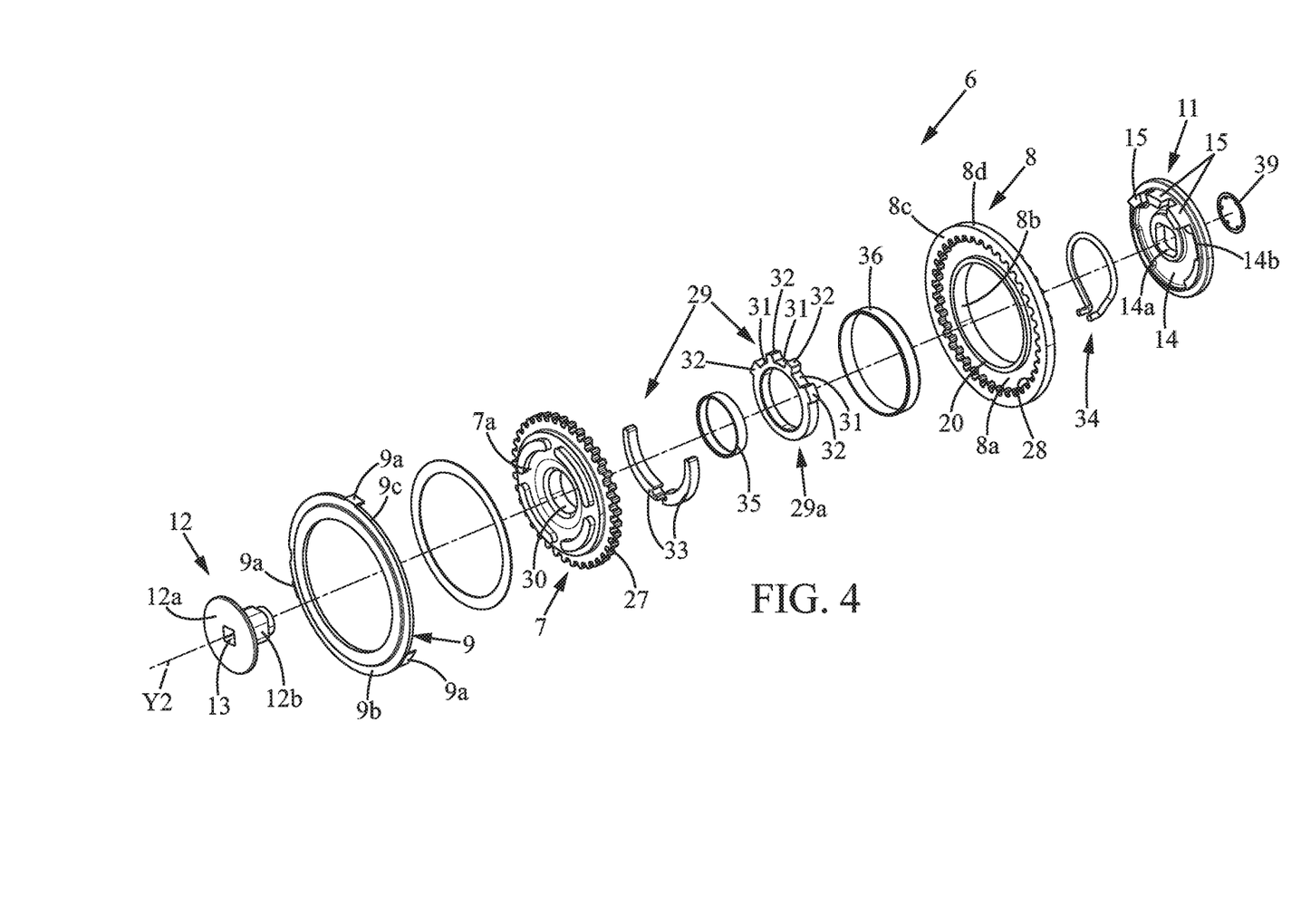
FIGS. 4 and 5 are exploded perspective views of the hinge mechanism of FIG. 2, respectively viewed in directions IV and V of FIG. 2.
Figure 5:
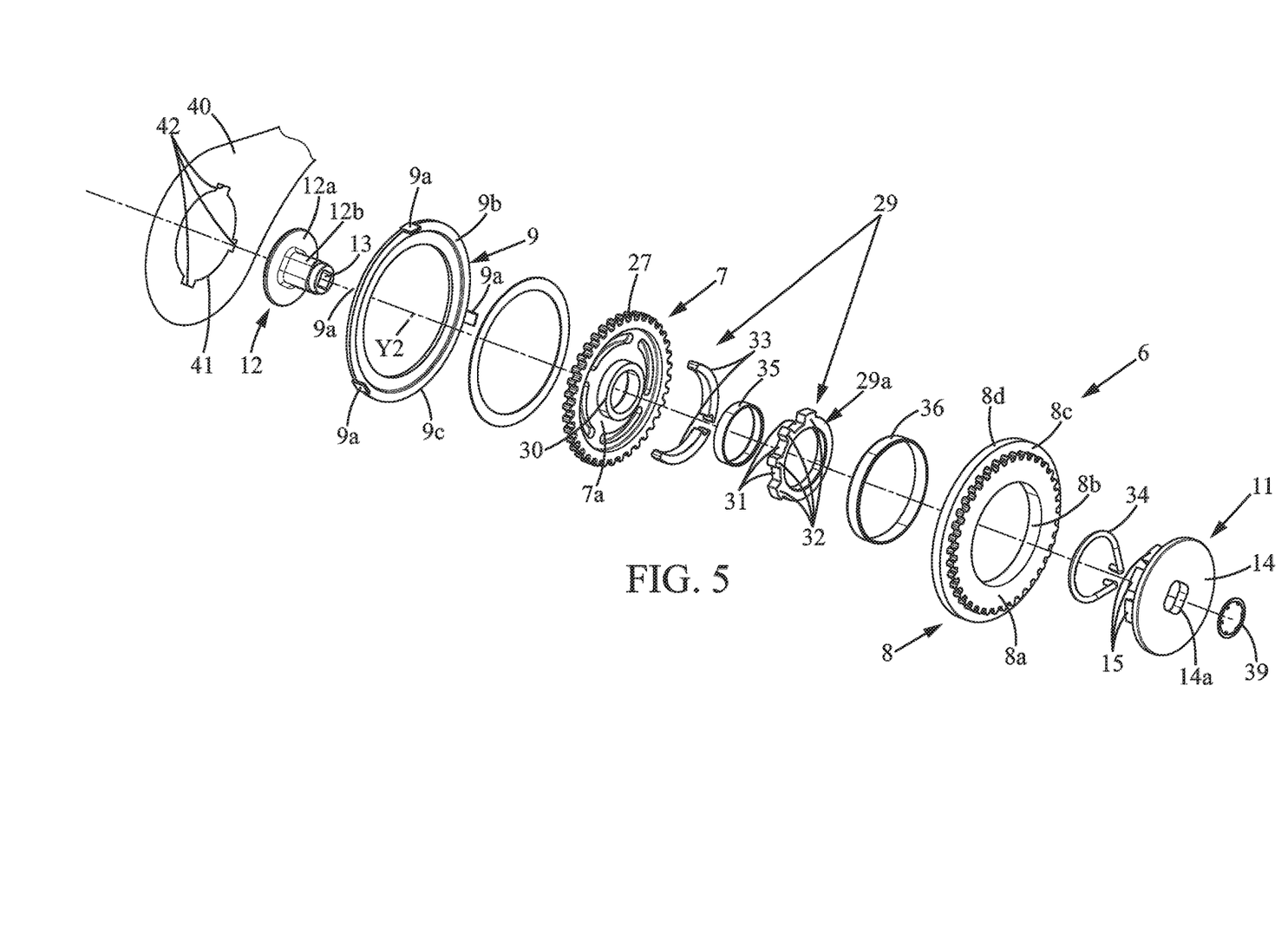

As shown in FIGS. 4 to 6, the second flange 8a may comprise a flat annular outer portion 8c which has an outer periphery 8d, for example circular.

The closure ring 9 may comprise a flat annular outer portion 9b which is in axial abutment against the outer portion 8c of the second flange 8a, the outer portion of the closure ring having a circular outer periphery 9c of the same diameter as and arranged to correspond to the outer periphery 8d of the outer portion of the second hinge flange 8a.

The closure ring 9 may further comprise outer tabs 9a, for example three outer tabs 9a arranged at 120 degrees from each other.

The hinge mechanism 6 can thus be preassembled by crimping the tabs 9a on the outer periphery 8d of the second flange. This crimping serves only to hold the two flanges 7a, 8a together; it does not provide the mechanical strength required during use of the hinge mechanism in the vehicle seat.

After this preassembly step (a), the hinge mechanism 6 is assembled by fitting at least the outer periphery 8d of the outer portion of the second flange 8a into an internal opening 41 of the external frame, then welding the second flange 8a to both the external frame 40 and the retaining ring 9 by a same weld 43 made at the outer peripheries 8d, 9c mentioned above.

The internal opening 41 of the external frame 40 may have a generally circular shape of substantially the same diameter as the outer periphery 8d, with notches to allow the passage of the crimped tabs 9a.

The weld 43 may be made for example by laser, using a laser beam L applied on the main face of the hinge mechanism 6 which corresponds to the first flange 7a.

The weld 43 may extend angularly over a plurality of sections in circular arcs where each pair of adjacent sections is separated by said outer tabs 9a.

Figure 6C:
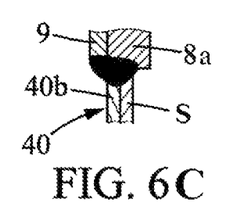

One will note that the external frame 40 could be associated with an additional structural part S (FIG. 6C), in particular a metal part, which would also include an internal opening corresponding to the internal opening 41 of the external frame 40 and which would be integrally secured with the second flange 8a, the external frame 40, and the closure ring 9 by said weld 43.

The hinge mechanism just described operates conventionally: when a user actuates the input member 11 by means of the aforementioned driving device 6b, one of the outer fingers 32 of the ring 29a abuts angularly against the thin end of one of the rigid wedge-shaped members 33, so that the cam 29 rotates in the central opening 8b, driving the gear 10, causing the second frame 8 to rotate with the backrest 2 relative to the first frame 7 and to the seat 3.

Figure 7:
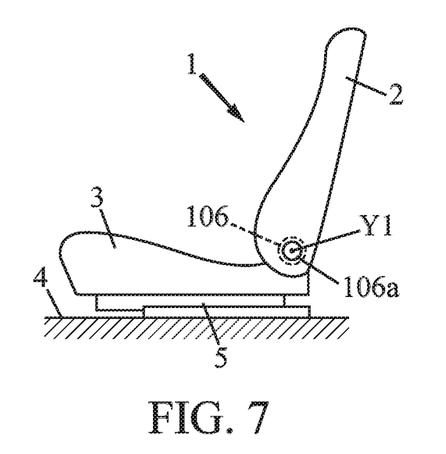
FIG. 7 is a schematic view of a vehicle seat that can be equipped with a hinge mechanism according to the present description, in a second embodiment.
Figure 8:
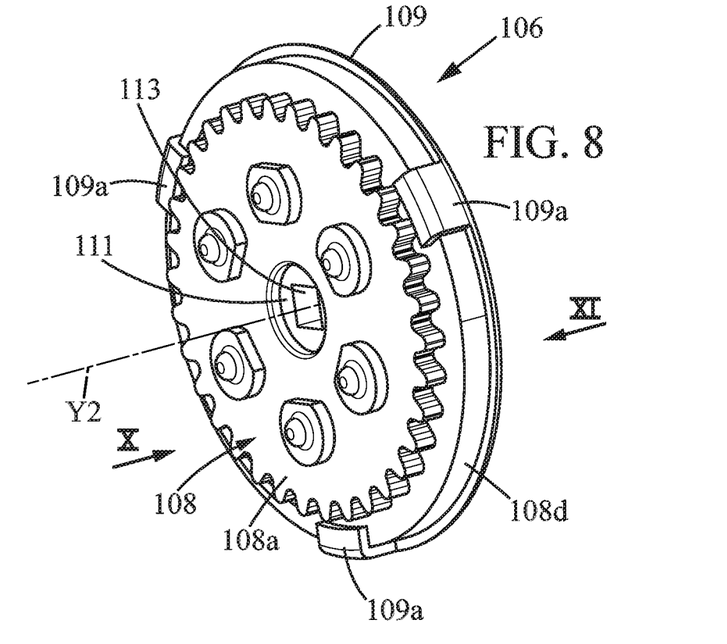
FIGS. 8 and 9 are perspective views, in two opposite directions, of the hinge mechanism that can equip the seat of FIG. 7, in one embodiment of the invention.
Figure 9:
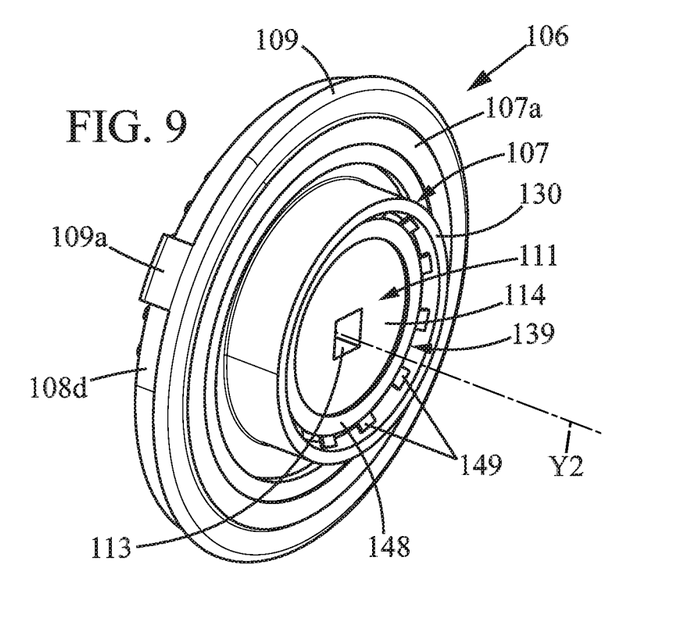

For the second embodiment, FIG. 7 represents a front seat 1 of a motor vehicle, which comprises a backrest 2 mounted so as to pivot on a seating portion 3 about an axis Y1, the seating portion being mounted on the floor 4 of the vehicle, for example by means of rails 5.

The tilt of the backrest 2 is manually adjustable by means of a rotary control knob 106a or the like, which drives a geared hinge mechanism 106 (therefore a mechanism that positively controls the rotation of the backrest). One embodiment of this is represented in FIGS. 8 to 12. Alternatively, the driving of the mechanism 106 may be controlled by an electric motor or other means.

This hinge mechanism 106 comprises (see FIGS. 8 to 12):
a first frame 107 comprising a first disk-shaped metal flange 107a which extends in a plane perpendicular to axis Y1 and which, in the example shown, may be for example integrally secured to the frame of the seating portion 3,
a second frame 108 formed by a second disc-shaped metal flange 108a which extends parallel to the first flange 107a, said second flange 108a being for example integrally secured to the backrest frame 2 and being retained against the first flange 107a by a metal closure ring 109 integrally secured to said second flange 108a while surrounding the first frame 107,
a cycloid gear 110 interconnecting the first and second frames 107, 108 (see FIG. 12),
and an input member 111, also called a control stem, which controls the cycloid gear 110.

The input member 111, clearly visible in FIGS. 8 to 13, may be made for example in one piece by molding plastic or a light alloy. This input member 111 comprises a central shaft 112 which extends longitudinally along a central axis Y2 parallel to said axis Y1 but offset relative to this axis Y1.

The central shaft 112 may optionally be pierced by an inner opening 113 that is square (or grooved, or other) into which the aforementioned control knob 106a can fit.

Furthermore, the central shaft 112 is extended radially outwardly, at its end opposite the second flange 108, by a flange ring 114 which extends parallel to the flanges 107a, 108a. The inner face of the flange ring 114 is extended towards the cycloid gear 110 by at least one abutment member 115, in the current case two abutment members 115 which here are fingers extending parallel to axis Y2 towards the second flange 108a, their utility to be seen further below.

The central shaft 112 has a right circular cylindrical shape centered on axis Y2 and rotates in a bearing that is integrally secured to the second flange 108a and centered on axis Y2. The bearing is formed here by a cylindrical through-opening 121 formed in the second flange 108a and in a collar 120 which is integrally secured to the second flange. The collar 120 may for example be formed as one piece with the second flange 108a and it extends axially from the second flange 108a towards the first flange 107a.

The cycloid gear 110 is here a single-train gear (but it could also be a cycloid planetary gear) which comprises for example:
a first circular set of teeth 127 centered on axis Y1, this set of teeth being oriented radially outwards and formed at the periphery of the first flange 107a,
a second circular set of teeth 128 which is formed on the inner face of the second flange 108a and which is oriented radially inwards, this second set of teeth being centered on axis Y2, said second set of teeth 128 having an inside diameter greater than the outside diameter of the first set of teeth 127, and a rigid eccentric cam 129, for example of metal, which extends perpendicularly to axis Y1 and which is driven by the input member 111, this cam rotating around the collar 120 within a right circular cylindrical housing 130a integrally secured to the first flange 107a and passing through the flange 107a, said housing 130a being centered on axis Y1. The cylindrical housing 130a is formed in particular by the smooth cylindrical inner surface of a metal collar 130 that is integrally secured to the first flange 107a.

A ring 131 forming a bearing may where appropriate be interposed radially between the eccentric cam 129 and the housing 130a, this ring being force-fitted into the housing 130a.

The input member 111 is rotatably connected to the eccentric cam 129. Thus, the rotation of the input member 111 about the second axis Y2 causes rotation of the cam 129 about the second axis Y2, which causes a relative rotation between the first and second flanges 107a, 108a.

The cam 129 could be formed as one piece, but in the particular case considered here, it is composed (see FIGS. 9 to 12) of two disc-shaped superimposed metal half-cams 129a, 129b. The half-cams 129a, 129b are movable in relative rotation between a minimum eccentric position and a maximum eccentric position.

The half-cams 129a, 129b are elastically biased towards their maximum eccentric position by a spring 135 which has two axial arms 136 simultaneously entering two openings 137 that are respectively part of the half-cams 129a, 129b. In the rest position of the hinge mechanism, the half-cams 129a, 129b serve to compensate for the internal gaps of the cycloid gear 110.

Finally, the control member 111 is retained axially in the first and second flanges 107a, 108a:
- by abutment against a metal retaining part 139, in this case a retaining ring 139 adapted to retain the control member 111 in a first direction parallel to the first axis Y1,
- and in the second direction opposite to the first direction, by direct or indirect abutment against the second flange 108a: in the example considered here, the periphery of the flange ring 114 abuts against the ring 131 which itself abuts against the inner face of the first flange 108a in the second direction.

The retaining ring 139 is force-fitted into the collar 130 of the first frame and is locked in said collar by butting against the inner surface 130a of said collar, and the control member abuts against said retaining ring in the first direction. The retaining ring 139 comprises a radial ring 148 whose periphery is cut into crenellations to form teeth 141 which are bent to extend obliquely, radially outward, and axially in the first direction. These peripheral teeth are braced by abutting elastically against the inner surface 130a of the collar, which provides effective locking of the retaining ring 139 in the first direction due to the metal-to-metal contact between the teeth 141 and the collar 130.

Figure 10:
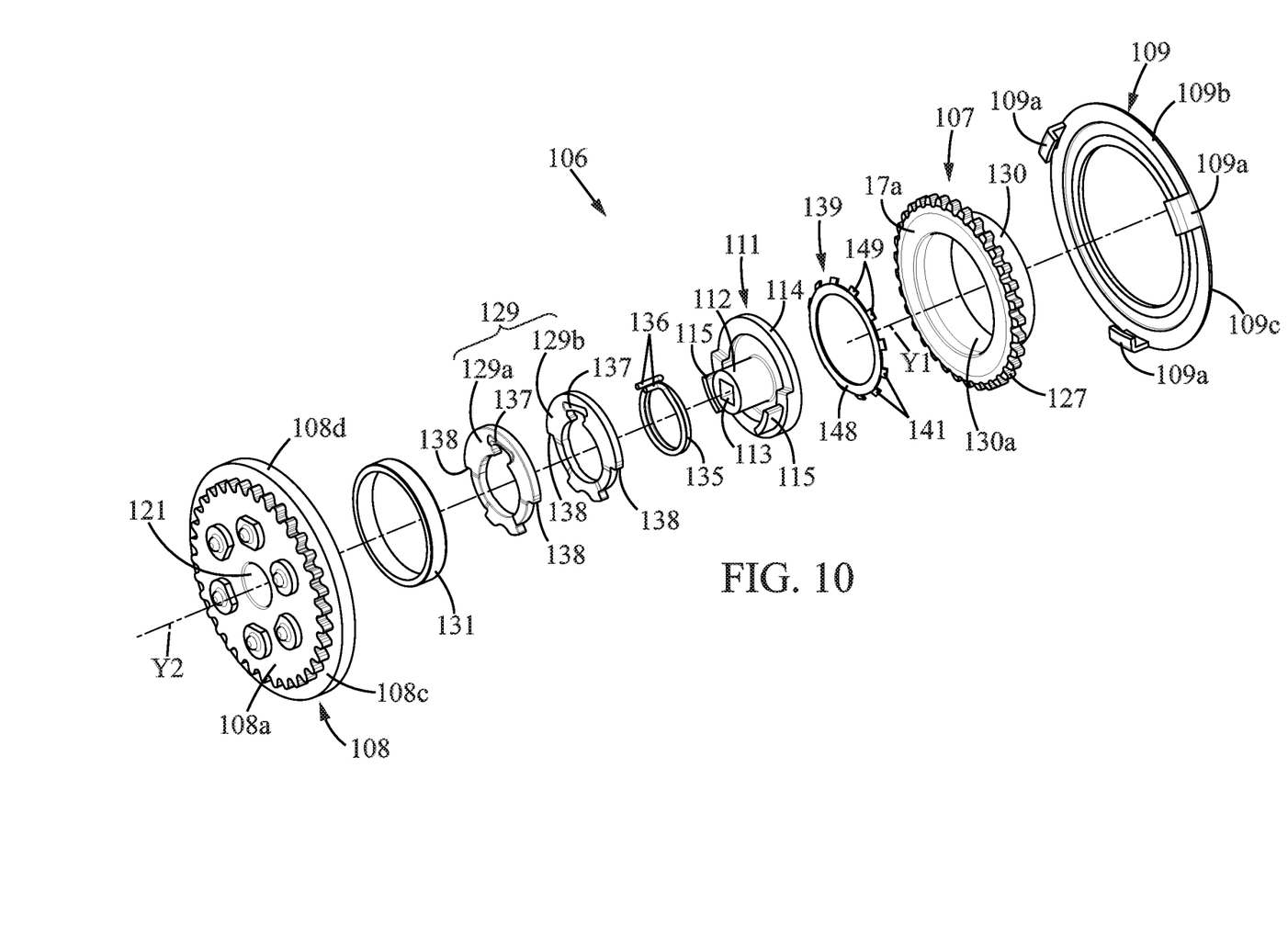
FIGS. 10 and 11 are exploded perspective views of the hinge mechanism of FIG. 7, respectively viewed along respective directions X and XI of FIG. 8.
Figure 11:
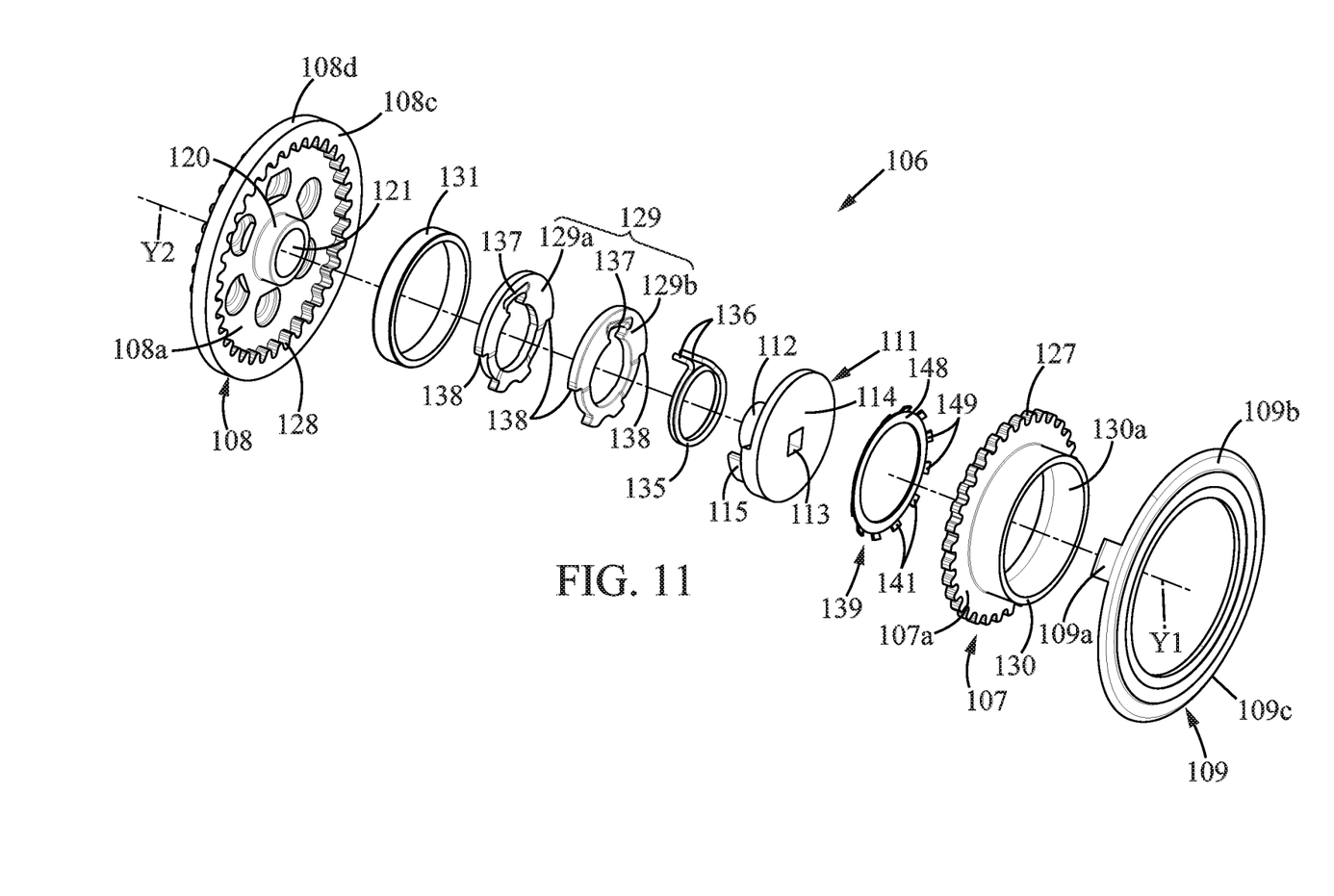
Figure 12:
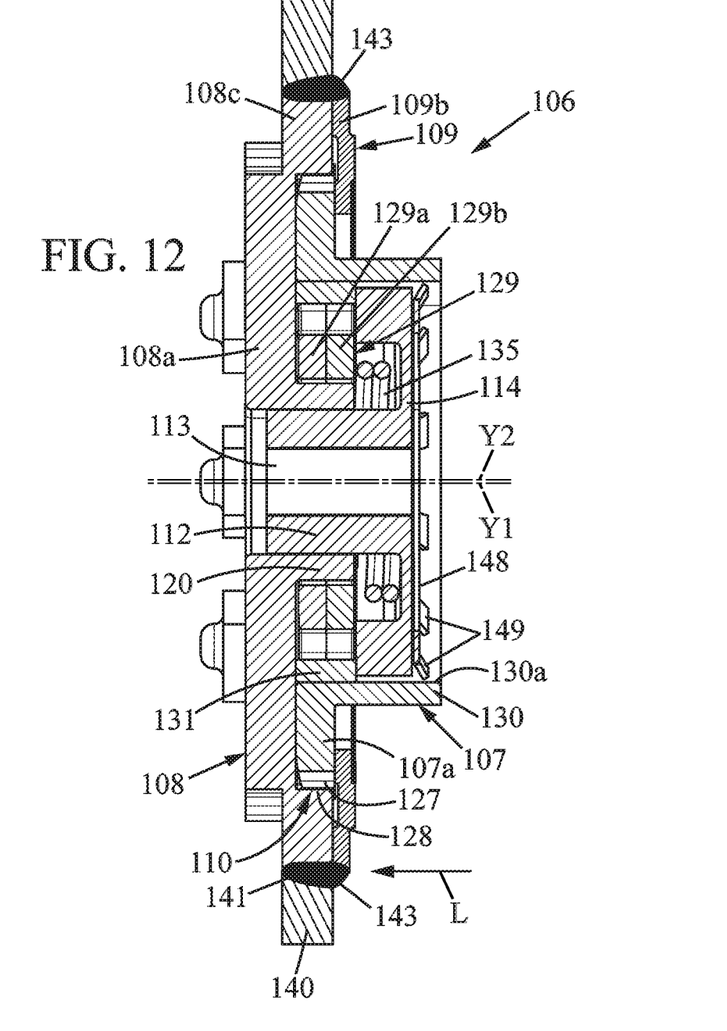
FIG. 12 is an axial section view of the hinge mechanism of FIG. 8, partially assembled to the external frames.
Figure 13:
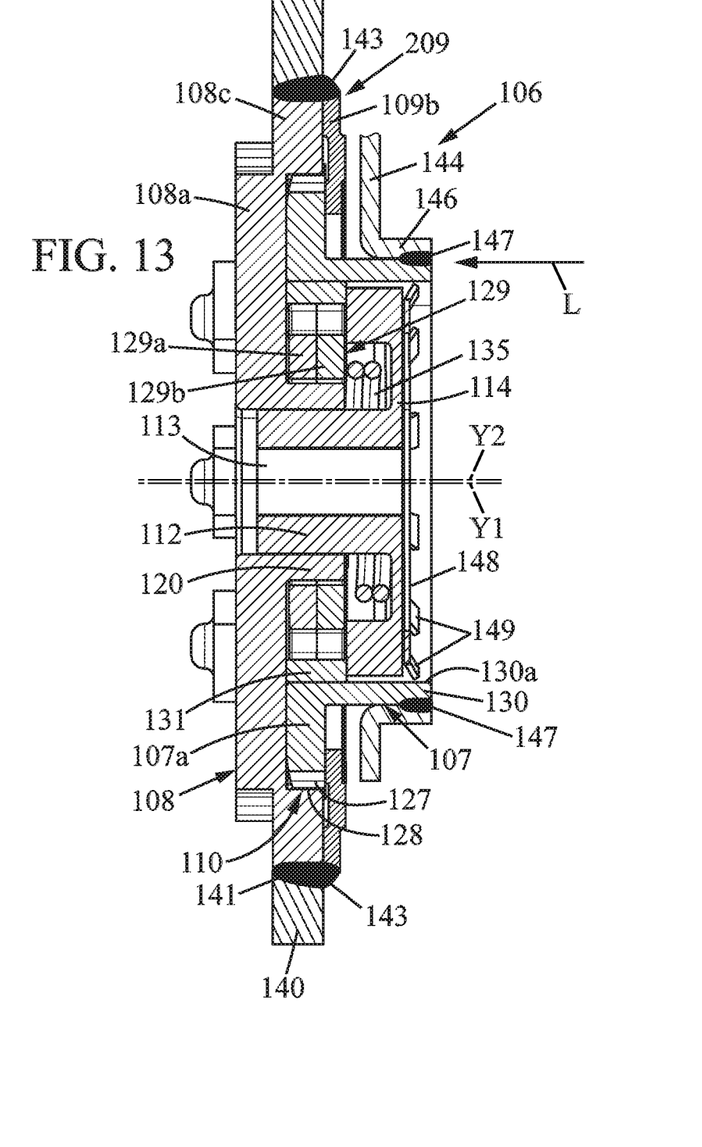
FIG. 13 is a view similar to FIG. 12, showing the hinge mechanism completely assembled to the external frames.

As shown in FIGS. 10 to 12, the second flange 108a may comprise a flat annular outer portion 108c which has an outer periphery 108d that is for example circular.

The closure ring 109 may comprise a flat annular outer portion 109b which is in axial abutment against the outer portion 108c of the second flange 108a, the outer portion of the closure ring having a circular outer periphery 109c of the same diameter as and arranged to correspond to the outer periphery 108d of the outer portion of the second hinge flange 108a.

The closure ring 109 may further comprise outer tabs 109a, for example three outer tabs 109a arranged at 120 degrees from each other.

The hinge mechanism 106 can thus be preassembled by crimping the tabs 109a onto the outer periphery 108d of the second flange 108a. This crimping serves only to hold the two flanges 107a, 108a together; it does not provide the mechanical strength required during use of the hinge mechanism in the vehicle seat.

After this pre-assembly step (a), the hinge mechanism 106 is assembled by fitting at least the outer periphery 108d of the outer portion of the second flange 108a into an internal opening 141 of the external frame 140, then welding the second flange 108a to both the external frame 140 and the retaining ring 109 by a same weld 143 made at the above-mentioned outer peripheries 108d, 109c.

The internal opening 141 of the external frame 140 may have a generally circular shape of substantially the same diameter as the outer periphery 108d, with notches to allow the passage of the crimped tabs 109a.

The weld 143 may be made for example by laser, using a laser beam L applied in the direction of the main face of the hinge mechanism 106 which corresponds to the first flange 107a.

The weld 143 may extend angularly over a plurality of sections in circular arcs where each pair of adjacent sections is separated by said outer tabs 109a.

Note that the external frame 140 may in particular be composed according to the three variants shown in FIGS. 6, 6A, 6B, or otherwise.

After assembly with the external frame 140, the manufacturing method may further comprise a step (c) in which the collar 130 of the first flange 107a is welded to an additional external frame 144 (FIG. 13) which may be connected to the frame of the seating portion. The additional external frame 144 may in particular be a bracket adapted to be integrally secured to the frame of the seating portion or may be part of the frame of the seating portion, for example a lateral flange. The additional external frame 144 may for example comprise an inner collar 146 which is fitted on collar 130 and welded thereto by a weld 147. The weld 147 may be made by laser, by applying the abovementioned laser beam L directed towards said first main face of the hinge mechanism 106 as was weld 143. This step (c) can therefore be performed without having to flip the hinge mechanism 106.

The hinge mechanism 106 just described functions the same as the hinge mechanism 6 previously described.

Although the two embodiments described above both comprise a geared control device, the invention also applies to so-called "discontinuous" types of hinge mechanisms, where the control device is a locking device which selectively locks or unlocks the rotation of the first and second flanges relative to each other.

The invention claimed is:
1. A hinge mechanism comprising:
   first and second hinge flanges mounted so as to rotate relative to one another about at least one axis of rotation and defining an internal volume between them,
   a control device arranged in the internal volume and controlling a relative rotation of the first and second hinge flanges, a closure ring integrally secured to the second hinge flange and retaining the first hinge flange against the second hinge flange, and an external frame integrally secured to the second hinge flange, wherein a weld is integrally securing the second hinge flange to both the external frame and the closure ring, wherein the closure ring comprises a flat annular outer portion which is in axial abutment against an outer portion of the second hinge flange, the outer portion of the closure ring having a circular outer periphery with a diameter that is the same as a diameter of an outer periphery of the outer portion of the second hinge flange, said outer periphery of the closure ring and said outer periphery of the outer portion of the second hinge flange being arranged in mutual correspondence, wherein at least the outer periphery of the outer portion of the second hinge flange is fitted into an internal opening of the external frame, and wherein the weld covers the outer periphery of the outer portion of the second hinge flange, the outer periphery of the closure ring, and the internal opening of the external frame.

2. The hinge mechanism according to claim 1, wherein the second hinge flange is further secured to the closure ring by crimping.

3. The hinge mechanism according to claim 2, wherein the closure ring has a plurality of outer tabs crimped onto the outer periphery of the second hinge flange.

4. The hinge mechanism according to claim 3, wherein the weld extends angularly across a plurality of sections where each pair of adjacent sections is separated by said outer tabs.

5. A method for manufacturing the hinge mechanism according to claim 4, comprising the following steps:
(a) a temporary pre-assembly step, in which the closure ring is fixed temporarily to the second hinge flange, and the outer tabs of the closure ring are crimped onto the outer periphery of the second hinge flange, and
(b) an assembly step, in which the welding is carried out in a manner that permanently assembles the closure ring, second hinge flange, and external frame, wherein the welding is carried out in said plurality of sections where each pair of sections is separated by said outer tabs.

6. The hinge mechanism according to claim 1, wherein the outer portion of the second hinge flange comprises a flat annular outer portion.

7. The hinge mechanism according to claim 1, wherein the external frame is a lateral flange that is part of either a backrest frame or a seating portion frame.

8. The hinge mechanism according to claim 1, wherein the external frame is a bracket adapted for attachment to a lateral flange that is part of either a backrest frame or a seating portion frame.

9. The hinge mechanism according to claim 1, further comprising a structural part which is integrally secured by said weld to the second hinge flange, the external frame, and the closure ring.

10. The hinge mechanism according to claim 1, wherein the first hinge flange comprises a collar extending axially along said at least one axis of rotation through the closure ring, said collar being welded to an additional external frame by an additional weld.

11. A method for manufacturing the hinge mechanism according to claim 10, wherein the hinge mechanism has a first main face corresponding to the first hinge flange and a second main face corresponding to the second hinge flange, and wherein the method comprises the following steps:
(a) a temporary pre-assembly step, in which the closure ring is fixed temporarily to the second hinge flange,
(b) an assembly step, in which the welding is carried out in a manner that permanently assembles the closure ring, second hinge flange, and external frame, wherein the closure ring is welded to the second hinge flange and the external frame, from the first main face of the hinge mechanism, and
(c) an additional step, subsequent to step (b), in which the collar of the first hinge flange is welded to said additional external frame, from the first main face of the hinge mechanism.

12. A vehicle seat comprising first and second parts connected to each other by the hinge mechanism according to claim 1, the first and second hinge flanges being respectively fixed to the first and second parts.

13. The seat according to claim 12, wherein the first part of the seat is a seating portion and the second part of the seat is a backrest.

14. A method for manufacturing the hinge mechanism according to claim 1, comprising the following steps:
(a) a temporary pre-assembly step, in which the closure ring is fixed temporarily to the second hinge flange, and
(b) an assembly step, in which the welding is carried out in a manner that permanently assembles the closure ring, second hinge flange, and external frame.

* * * * *